United States Patent
Elwell (10) Patent No.: US 9,157,996 B1
(45) Date of Patent: Oct. 13, 2015

(54) MULTIPLE ULTRASONIC PREAMPLIFIERS WITH INDEPENDENT AUTOMATIC GAIN CONTROL

(75) Inventor: Brian Eugene Elwell, Tyrone, GA (US)

(73) Assignee: Cooper Technologies Company, Houston, TX (US)

( * ) Notice: Subject to any disclaimer, the term of this patent is extended or adjusted under 35 U.S.C. 154(b) by 786 days.

(21) Appl. No.: 13/463,216

(22) Filed: May 3, 2012

(51) Int. Cl.
*G01S 15/00* (2006.01)
*G01S 7/52* (2006.01)
*G01S 15/04* (2006.01)

(52) U.S. Cl.
CPC .............. *G01S 15/04* (2013.01); *G01S 7/52033* (2013.01)

(58) Field of Classification Search
CPC .............................. G01S 15/04; G01S 7/52033
USPC ................................................ 367/93, 98, 129
See application file for complete search history.

(56) References Cited

U.S. PATENT DOCUMENTS 3,781,859 A * 12/1973 Hermans ........................ 340/507
5,973,996 A * 10/1999 Zhevelev et al. ................. 367/99
6,370,083 B1 * 4/2002 Foreman ........................ 367/126

* cited by examiner

*Primary Examiner* — Mark Hellner
(74) *Attorney, Agent, or Firm* — King & Spalding LLP (57) ABSTRACT

Multiple signals are received from multiple receivers in a motion sensor. Each signal is amplified and undergoes a gain adjustment individually to generate multiple preamplified received ultrasonic signals. A separate demodulator circuit receives a different preamplified received ultrasonic signal and generates a sum of the demodulated signals and a difference between the demodulated signals. A low pass filter corresponding to a demodulator circuit removes the sum of the demodulated signals. The mixer circuit combines the difference between the demodulated signals to generate an integrated circuit. The gain of each preamplifier may be adjusted based on a sensitivity setting, target levels of the preamplifier, and a level of a preamplified ultrasonic signal, resulting in an integrated motion sign that originated from multiple signals to different receivers in the sensor housing.

27 Claims, 7 Drawing Sheets

MULTIPLE ULTRASONIC PREAMPLIFIERS WITH INDEPENDENT AUTOMATIC GAIN CONTROL

TECHNICAL FIELD

The present disclosure relates generally to ultrasonic occupancy sensing, and more particularly, to processing multiple receiver signals used in an ultrasonic occupancy sensor.

BACKGROUND

Ultrasonic occupancy sensors are used to detect the presence of moving objects (e.g., a person) entering an area of interest (e.g., a room). When such a moving object is detected, the ultrasonic occupancy sensors perform a function (e.g., turn on lights in the room, adjust a thermostat). The ultrasonic occupancy sensor radiates (transmits) high frequency sound waves that are undetectable to the human ear. These sound waves bounce off surfaces, including people. Motion is detected via shifts in frequency that are detected as "Doppler shift" when receiving the reflected sound waves and comparing the frequency thereof to the transmitted sound wave frequency in a frequency mixer and then through a low pass filter.

The relative acoustic strength of the high frequency sound waves is affected by many factors including cubic footage of desired coverage, partitions, drapes, carpeting, furniture, potential reflection patterns, and the efficiency of the transducer converting electrical energy into acoustic energy. If adjustments in detection sensitivity are required, present technology ultrasonic occupancy sensors use either a potentiometer (manual) or algorithms in a microcontroller (automatic) to adjust the amplitude of the received signal. Adjusting the amplitude of the received signal is critical to avoid saturation (overload) of the receiver circuitry and to accommodate various noise sources such as heavy airflow from a supply register in the ceiling, floor, and/or wall. Adjusting the detection sensitivity automatically can be referred to as automatic gain control (AGC). Adjustments to the signal can be performed by a preamplifier, also called a preamp.

At times, multiple receivers are used in a single ultrasonic occupancy sensor. By using multiple receivers, the ultrasonic occupancy sensor can cover a larger area compared with an ultrasonic occupancy sensor that uses a single receiver.

SUMMARY

In general, in one aspect, the disclosure relates to a method for generating an integrated signal. The method can include receiving a first signal from a first receiver of a number of receivers, and processing, using a first demodulator, a first amplified signal to generate a first demodulated signal, where the first amplified signal is derived from the first signal. The method can also include receiving a second signal from a second receiver of the number of receivers, and processing, using a second demodulator, a second amplified signal to generate a second demodulated signal, where the second amplified signal is derived from the second signal. The method can further include processing the first demodulated signal and the second demodulated signal to generate the integrated signal.

In another aspect, the disclosure can generally relate to a method for automatic gain control of a preamplifier. The method can include receiving a sensitivity setting, and determining a target level for a preamplifier based on the sensitivity setting, where the target level includes a minimum target level and a maximum target level bounding a range of target levels. The method can also include determining a level of a preamplified ultrasonic signal, where the preamplified ultrasonic signal is derived from a mixed signal, and where the mixed signal includes a combination of a number of signals generated by a number of receivers. The method can further include adjusting a gain of the preamplifier when the level of the preamplified ultrasonic signal is excluded from the range of target levels, and amplifying, using the gain and the preamplifier, the preamplified ultrasonic signal to generate an amplified signal.

In yet another aspect, the disclosure can generally relate to an ultrasonic occupancy sensor. The ultrasonic occupancy sensor can include a first demodulator configured to generate a first demodulated signal, where the first demodulated signal is derived from a first signal received by a first receiver. The ultrasonic occupancy sensor can also include a second demodulator circuit configured to generate a second demodulated signal, where the second demodulated signal is derived from a second signal received by a second receiver. The ultrasonic occupancy sensor can further include a mixer circuit communicably coupled to the first demodulator and the second demodulator, where the mixer circuit is configured to receive the first demodulated signal and the second demodulated signal and generate an integrated signal.

These and other aspects, objects, features, and embodiments will be apparent from the following description and the appended claims.

BRIEF DESCRIPTION OF THE DRAWINGS

The drawings illustrate only exemplary embodiments of multiple ultrasonic preamps with independent AGC and are therefore not to be considered limiting of its scope, as the multiple ultrasonic preamps with independent AGC may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION OF EXEMPLARY EMBODIMENTS

Exemplary embodiments of multiple ultrasonic preamps with independent AGC will now be described in detail with reference to the accompanying figures. Like, but not necessarily the same or identical, elements in the various figures are denoted by like reference numerals for consistency. In the following detailed description of the exemplary embodiments, numerous specific details are set forth in order to provide a more thorough understanding of the disclosure herein. However, it will be apparent to one of ordinary skill in the art that the exemplary embodiments herein may be practiced without these specific details. In other instances, well-known features have not been described in detail to avoid unnecessarily complicating the description.

The multiple ultrasonic preamps with independent AGC described herein may be used with certain of a number of sensing technologies. For example, exemplary embodiments of multiple ultrasonic preamps with independent AGC are used with ultrasonic sensing technology. Ultrasonic sensing technology uses the Doppler principle to detect occupancy by emitting an ultrasonic high-frequency signal throughout a space, such as a room, hallway, or a portion thereof, sensing the frequency of the reflected signal, and interpreting a change in the frequency as motion in the space.

The ultrasonic occupancy sensors using multiple ultrasonic preamps with independent AGC described herein may be a standalone unit in a space, one of a number of ultrasonic occupancy sensors in a space, or one of a number of ultrasonic occupancy sensors in a network of spaces.

Figure 1:
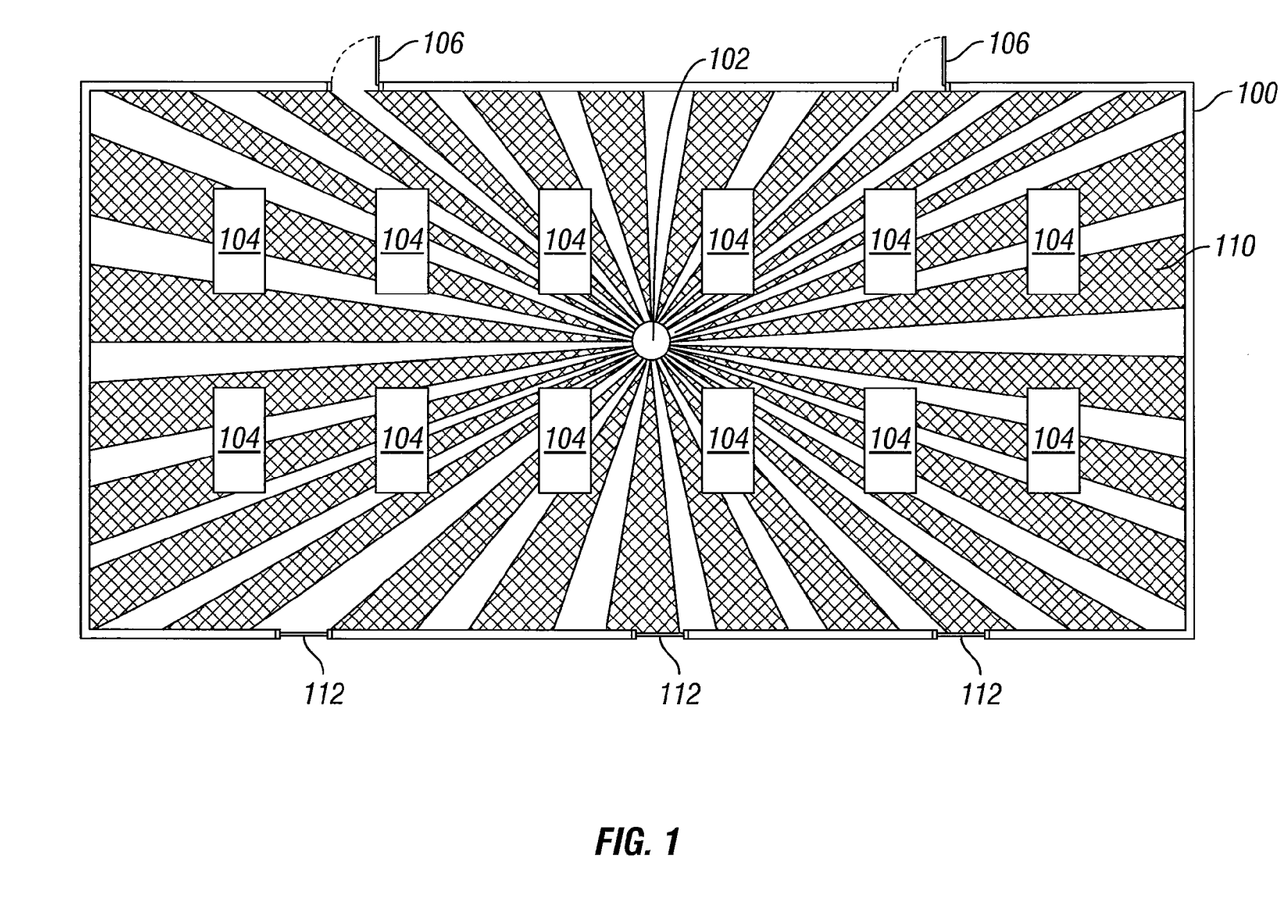
FIG. 1 shows a schematic plan view of a space having an ultrasonic sensing device installed for motion detection using multiple ultrasonic preamps with independent AGC in accordance with certain exemplary embodiments.

FIG. 1 depicts a schematic plan view of a space 100 having an ultrasonic occupancy sensor 102 installed for detecting motion therein according to one exemplary embodiment. Referring now to FIG. 1, the space 100 in this example is shown having two access doors 106, multiple light fixtures 104, and multiple windows 112. The ultrasonic occupancy sensor 102 is positioned within the space 100 and transmits and receives ultrasonic acoustic waves 110. For example, the positioning of the occupancy sensor 102 could include being mounted to the ceiling, wall, or floor of the space 100. In certain exemplary embodiments, the location of the ultrasonic occupancy sensor 102 in the space 100 is selected for optimum coverage and sensing of movement in the space 100, e.g., people entering and occupying the space 100. The space 100 may be any area, including but not limited to a conference room, office, classroom, hallway, corridor, warehouse, open area space, closet, bathroom, or any portion thereof.

Figure 2:
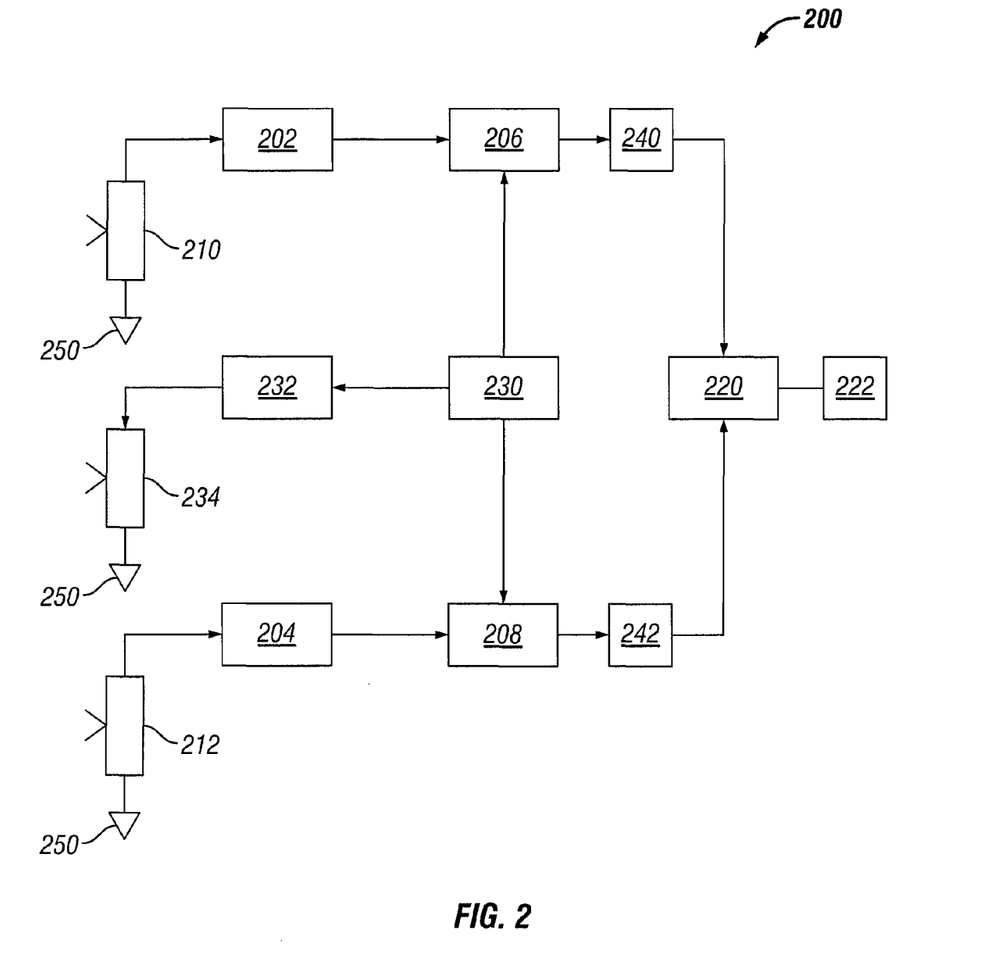
FIG. 2 shows a diagram of an exemplary ultrasonic occupancy sensor that includes multiple ultrasonic preamps with independent AGC in accordance with certain exemplary embodiments.

FIG. 2 is a diagram of an ultrasonic occupancy sensor 200 using multiple ultrasonic preamps with independent AGC in accordance with certain exemplary embodiments. Referring now to FIGS. 1 and 2, the exemplary ultrasonic occupancy sensor 200 includes two receivers: receiver A 210 and receiver B 212; two preamplifier circuits: preamp A 202 and preamp B 204; two demodulator circuits: demodulator A 206 and demodulator B 208; a mixer circuit 220; a bandpass filter 222; an ultrasonic oscillator 230; a transmitter driver 232; a transmitter 234; and a ground source 250. Each of these example components is described below. In certain exemplary embodiments some or all of the components of the ultrasonic occupancy sensor 200 are located within a single enclosure or housing (not shown). Exemplary embodiments are not limited to the configuration shown in FIG. 2 and discussed herein.

The ultrasonic oscillator 230 is communicably coupled to the transmitter driver 232, the demodulator circuit A 206, and the demodulator circuit B 208. In addition, or in the alternative to the demodulator circuit A 206 and the demodulator circuit B 208, the ultrasonic oscillator 230 can be communicably coupled to the mixer circuit 222. The ultrasonic oscillator 230 generates the ultrasonic signal that is transmitted into the space being monitored. The ultrasonic oscillator 230 can generate a high-frequency (e.g., 32 kHz-40 kHz) signal. The signal generated by the ultrasonic oscillator 230 is fed to the transmitter driver 232, the demodulator circuit A 206, and the demodulator circuit B 208. The transmitter driver 232 receives the signal generated by the ultrasonic oscillator 230 and processes the signal for the transmitter 234, which transmits the ultrasound signal into the space 100. Specifically, in one exemplary embodiment, the transmitter driver 232 amplifies the signal frequency from the ultrasonic oscillator 230 in such a way as to cause the transmitter 234 to generate ultrasonic acoustic waves at a desired amplitude. In certain exemplary embodiments, the transmitter driver 232 drives multiple transmitters 234 to better fill the space 100 with acoustic energy. The amplitude and/or frequency of the acoustic waves sent by the transmitter 234 may be adjusted, either manually or automatically. In one exemplary embodiment, the transmitter driver 232 is controlled by a microprocessor based on a sensitivity setting, as described below. The transmitter 234 is electrically coupled to ground 250. The exemplary transmitter 234 transmits the ultrasound signal in all directions (as shown in FIG. 1 above) or in certain specific directions or ranges of directions.

The receiver A 210 and the receiver B 212 are communicably coupled to the preamp A 202 and the preamp B 204, respectively. Also, the receiver A 210 and the receiver B 212 are each electrically coupled to ground 250. The receiver A 210 and the receiver B 212 each receive a reflection and/or a direct transmittal of the ultrasonic waves transmitted by the transmitter 234. The reflections occur after each ultrasonic wave is reflected off of certain objects and/or surfaces in the space. The receiver A 210 and the receiver B 212 also each convert the ultrasonic waves into electrical signals. The reflection of the ultrasonic waves received by the receiver A 210 may have certain different characteristics compared to the reflection of the ultrasonic waves received by the receiver B 212. For example, the reflections of the ultrasonic waves often have varying frequency, strength, and/or amplitude. Such different characteristics typically arise when the size and/or distance of objects and/or surfaces of the space are not symmetrical around the ultrasonic occupancy sensor 200. Such different characteristics may also arise due to differences between the receivers, such as differences in sensitivity. While the exemplary embodiment of FIG. 2 shows two receivers, in alternative embodiments, more than two receivers may be included in the ultrasonic occupancy sensor 200.

The reflection of the ultrasonic waves received by the receiver A 210 is delivered to the preamp A 202. Similarly, the reflection of the ultrasonic waves received by the receiver B 212 is delivered to the preamp B 204. The preamp A 202 and the preamp B 204 are communicably coupled to the mixer circuit 220. The preamp A 202 and the preamp B 204 each amplify the respective electric signal (converted from the ultrasonic waves by the receivers) received by adjusting the gain of the signal. The amplified signals are then demodulated by the demodulator circuit A 206 and the demodulator circuit B 208 to generate a two demodulated signals (one demodulated signal from each demodulator). In certain exemplary embodiments, the preamp A 202 and the preamp B 204 are distinct and independent preamplifiers that are devoted to the signals received from the receiver A 210 and the receiver B 212, respectively. The configurations of the preamp A 202 and the preamp B 204 may be the same or different. Likewise, the demodulator circuit A 206 and the demodulator circuit B 208 are distinct and independent demodulators that are devoted to the amplified signals received from the preamp A 202 and the preamp B 204, respectively. The configurations of the demodulator circuit A 206 and the demodulator circuit B 208 may be the same or different. In certain exemplary embodiments, the preamp A 202 and the preamp B 204 may include certain of certain of a number of discrete components (e.g., operational amplifier, resistor, capacitor, P-channel junction field effect transistor (JFET)). In addition, or in the alternative, the configurations of the preamp A 202 and the preamp B 204 may include an integrated circuit. The preamp A 202 and/or the preamp B 204 may be programmable. For example, certain preamps may be controlled by a microprocessor (described below). An example of a configuration for the preamp A 202 and the preamp B 204 is described below with respect to FIG. 3. Those skilled in the art will appreciate that a number of other configurations of the preamps may be used to achieve the functions performed by the preamps.

In certain exemplary embodiments, a distinct preamplifier is provided for each receiver in the ultrasonic occupancy sensor 200, regardless of the number of receivers. For example, if there are 4 receivers in the ultrasonic occupancy sensor 200, there may be four preamplifiers, where each preamplifier processes a signal received from one of the four receivers. Alternatively, when multiple preamplifiers are included in the ultrasonic occupancy sensor 200, a single preamplifier is used for a number receivers. For example, there may be two preamplifiers, where one preamplifier processes the signal received from two of the receivers, and where the other preamplifier processes the signal received from the other two receivers.

In certain exemplary embodiments, the demodulator circuit A 206 and the demodulator circuit B 208 may include certain of a number of discrete components (e.g., resistor, capacitor). In addition, or in the alternative, the configurations of the demodulator circuit A 206 and the demodulator circuit B 208 may include an integrated circuit. The demodulator circuit A 206 and/or the demodulator circuit B 208 may be programmable. For example, certain demodulators may be controlled by a microprocessor (described below). The demodulator circuit A 206 and/or the demodulator circuit B 208 can, using the frequency received from the ultrasonic oscillator 230, generate the beat frequencies (sum and difference) between the two processed signals. An example of a configuration for the demodulator circuit A 206 and the demodulator circuit B 208 is described below with respect to FIG. 3. Those skilled in the art will appreciate that a number of other configurations of the demodulators may be used to achieve the functions performed by the demodulators.

In certain exemplary embodiments, a distinct demodulator is provided for each preamplifier in the ultrasonic occupancy sensor 200, regardless of the number of preamplifiers. Alternatively, when multiple demodulators are included in the ultrasonic occupancy sensor 200, a single demodulator is used for a number preamplifiers. For example, if there are 4 preamplifiers in the ultrasonic occupancy sensor 200, there may be four demodulators, where each demodulator processes a signal received from one of the four preamplifiers. Alternatively, there may be two demodulators, where one demodulator processes the signal received from two of the preamplifiers, and where the other demodulator processes the signal received from the other two preamplifiers.

In certain exemplary embodiments, the low pass filter A 240 and the low pass filter B 242 filter out the sum of the two processed demodulated signals generated by the demodulator circuit A 206 and the demodulator circuit B 208, respectively. The exemplary low pass filter A 240 and low pass filter B 242 includes a number of discrete components (e.g., resistor, capacitor). In addition, or in the alternative, the mixer circuit 220 includes an integrated circuit. The low pass filter A 240 and/or the low pass filter B 242 can be an active low pass filter or a passive low pass filter. In certain exemplary embodiments, the low pass filter A 240 and/or the low pass filter B 242 are part of the demodulator circuit A 206 and/or the demodulator circuit B 208, respectively. An example of a configuration for the exemplary mixer circuit 220 is described below in greater detail with respect to FIG. 4.

In certain exemplary embodiments, the mixer circuit 220 receives the sum difference of the demodulated signals generated by the demodulator circuit A 206 and the demodulator circuit B 208, and filtered by the low pass filter A 240 and the low pass filter B 242, and generates an integrated signal. The exemplary mixer circuit 220 includes a number of discrete components (e.g., resistors). In addition, or in the alternative, the mixer circuit 220 includes an integrated circuit. An example of a configuration for the exemplary mixer circuit 220 is described below in greater detail with respect to FIG. 4.

The bandpass filter 222 is communicably coupled to the mixer circuit 220. In certain exemplary embodiments, the bandpass filter 222 receives the integrated signal, as generated by the mixer circuit 220, and performs certain of a number of functions to the integrated signal. Such functions include, but are not limited to, filtration and amplification. The output of the bandpass filter 222 is a motion signal that is sent to a microprocessor (shown in FIG. 3 below).

Figure 3:
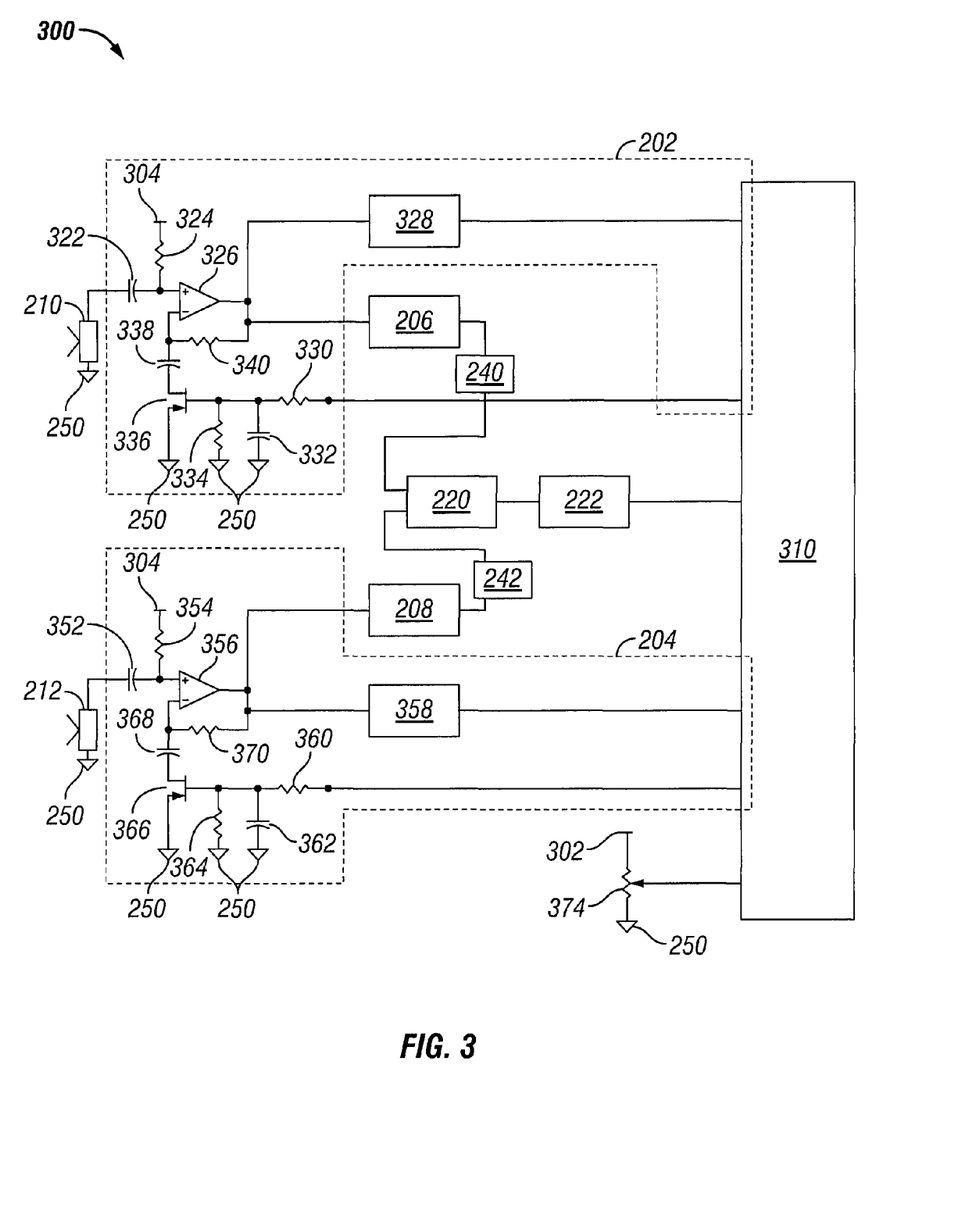
FIG. 3 shows example preamps of an ultrasonic occupancy sensor that includes multiple ultrasonic preamps with independent AGC in accordance with certain exemplary embodiments.

FIG. 3 shows example preamps (the preamp A 202 and the preamp B 204) of the ultrasonic occupancy sensor 200 that include multiple ultrasonic preamps with independent AGC in accordance with certain exemplary embodiments. Now referring to FIGS. 1-3, the receiver A 210, the receiver B 212, the mixer circuit 220, and the bandpass filter 222 are substantially similar to, and have substantially the same functionality as, the corresponding components described above with respect to FIG. 2. Further, the preamp A 202, the preamp B 204, the demodulator circuit A 206, and the demodulator circuit B 208 have substantially the same functionality as the corresponding components described above with respect to FIG. 2. The components of the exemplary preamp A 202, the exemplary preamp B 204, the exemplary demodulator circuit A 206, and the exemplary demodulator circuit B 208 are described below. Some or all of the components of preamp A 202, preamp B 204, demodulator circuit A 206, and demodulator circuit B 208 may be located within a single enclosure or pair of enclosures (one for each preamp). Exemplary embodiments are not limited to the configuration shown in FIG. 3 and discussed herein.

In this example shown in FIG. 3, the components and configuration of the preamp A 202 are substantially identical to the components of the preamp B 204. Similarly, the components and configuration of the demodulator circuit A 206 are substantially identical to the components of the demodulator circuit B 208. Accordingly, the components and configuration of the preamp A 202 is described, while the corresponding components and configuration of the preamp B 204 are inferred from the preamp A 202. For example, a description of the demodulator circuit A 206, the peak detection circuit A 328, and the P-channel JFET A 336 of the preamp A 202 corresponds to the demodulator circuit B 208, the peak detection circuit B 358, and the P-channel JFET B 366 of the preamp B 204.

Referring to the preamp A 202 in FIG. 3, the receiver A 210 is communicably coupled to the op amp A 326. The signal received from the receiver A 210 is sent through the capacitor 322, joined by a current from the bias voltage 304 through the resistor 324, to the V+ terminal of the op amp A 326. In certain exemplary embodiments, the op amp A 326 is communicably coupled to the peak detection circuit A 328. The op amp A 326 sends the signal to the peak detection circuit A 328, which determines the amplitude of the signal.

In certain exemplary embodiments, the peak detection circuit A 328 is communicably coupled to the microprocessor 310. The peak detection circuit A 328 generates a preamplified signal, which includes the signal level, and sends the preamplified signal level to the microprocessor 310. The microprocessor 310 is communicably coupled to the P-channel JFET A 336. In certain exemplary embodiments, the P-channel JFET A 336 is a N-channel JFET. The microprocessor 310 uses the preamplified signal level to generate a preamplified pulse width modulation (PWM) signal that is output to the P-channel JFET A 336 (which is filtered into a duty cycle-dependent direct current (DC) voltage) after traveling through the resistor 330, which is branched to ground 250 by the capacitor 332 and the resistor 334.

The P-channel JFET A 336 is communicably coupled to the op amp A 326. In certain exemplary embodiments, the P-channel JFET A 336 is used as a voltage variable resistor to control the gain of the op amp A 326. In this exemplary process, the preamplified ultrasonic signal undergoes automatic AGC adjustments to become an amplified signal. For example, if the duty cycle of the first preamplified ultrasonic signal is high, then the P-channel JFET A 336, the op amp A 326, and other associated components automatically reduce the gain of the signal. Specifically, the microprocessor 310 increases the duty cycle of the PWM signal, which decreases the gain of the preamp A 202 through the P-channel JFET A 336. If the P-channel JFET A 336 is a N-channel JFET in such a case, then the microprocessor 310 decreases the duty cycle of the PWM signal, which decreases the gain of the preamp A 202 through the N-channel JFET.

As another example, if the duty cycle of the first preamplified ultrasonic signal is low, then the P-channel JFET A 336, the op amp A 326, and other associated components automatically increase the gain of the signal. Specifically, the microprocessor 310 decreases the duty cycle of the PWM signal, which increases the gain of the preamp A 202 through the P-channel JFET A 336. If the P-channel JFET A 336 is a N-channel JFET in such a case, then the microprocessor 310 increases the duty cycle of the PWM signal, which increases the gain of the preamp A 202 through the N-channel JFET.

The op amp A 326 is communicably coupled to the demodulator circuit A 206. The amplified signal is sent to the demodulator circuit A 206. The amplified signal is demodulated by the demodulator circuit A 206 to generate the beat frequencies (sum and difference) between the two processed signals as a demodulated signal. In certain exemplary embodiments, the demodulated signal leaving the demodulator circuit A 206 only includes a motion component of the amplified signal.

Each demodulator (e.g., demodulator A 206, demodulator B 208) is communicably coupled to a corresponding low pass filter (e.g., low pass filter A 240, low pass filter B 242). The low pass filter A 240 filters out the sum of the two processed signals so that only the difference between the two processed signals pass through.

Each low pass filter (e.g., low pass filter A 240, low pass filter B 242) is communicably coupled to the mixer circuit 220. The difference of each demodulated signal (as generated by the corresponding low pass filter) is received by the mixer circuit 220 (described below in more detail with respect to FIG. 4). For example, the difference of the demodulated signal leaving the low pass filter B 242, as well as the difference of the demodulated signal(s) leaving any other low pass filter, is received by the mixer circuit 220, where the difference of the demodulated signals are combined to generate an integrated signal. The integrated signal is then sent to the bandpass filter 222, which passes the motion component of the signal to the microprocessor 310.

The sensitivity of certain settings (e.g., generation of the PWM signals) of the microprocessor 310 may be adjusted, manually or automatically, by adjusting the potentiometer 374. For example, the potentiometer 374 is used to adjust the target level of certain of the preamps and/or the output amplitude of the transmitter 234. The potentiometer 374 is fed by a common circuit voltage 302 and allows a varying amount of voltage and/or current to flow into the microprocessor 310, which in turn makes a corresponding change in the certain settings of, or driven by, the microprocessor 310. One such setting is a sensitivity setting. The opposite end (i.e., the end not electrically coupled to the common circuit voltage 302) of the potentiometer 374 is electrically coupled to ground 250.

The exemplary microprocessor 310 receives a voltage and/or current from the potentiometer 374 and makes adjustments to certain settings based on the voltage and/or current. For example, a voltage received by the potentiometer 374 allows the microprocessor 310 to establish or acquire a sensitivity setting. The sensitivity setting allows the microprocessor 310 to determine the amplitude of the ultrasonic acoustic waves, which in turn determines the amplitude of the electric signals created by the receivers that receive reflections of the ultrasonic acoustic waves.

In certain exemplary embodiments, the sensitivity setting also allows the microprocessor 310 to determine the target levels of the preamps. For example, the microprocessor 310, based on the sensitivity settings, determines a minimum target level and a maximum target level at which each of the preamps operate for a certain amount of gain. In such a case, if the amplified signal generated by the preamp is greater than the maximum target level, then the duty cycle of the PWM signal is increased, which decreases the preamp gain and therefore the amplitude of the signal coupled to the corresponding demodulator circuit. Alternatively, if the amplified signal generated by the preamp is less than the minimum target level, then the duty cycle of the PWM signal is decreased, which increases the preamp gain and therefore the amplitude of the signal coupled to the corresponding demodulator circuit.

In certain exemplary embodiments, the functions of the microprocessor 310 are performed by certain discrete components and/or some other type of component. The exemplary microprocessor 310 includes certain additional pins relative to a microprocessor used by those skilled in the art where a single mixed signal is processed rather than a number of signals from individual receivers. The exemplary microprocessor 310 is able to execute software. Specifically, the exemplary microprocessor 310 executes the instructions used to control certain components of the ultrasonic occupancy sensor 200. The exemplary microprocessor 310 is any one of an integrated circuit, a central processing unit, a multi-core processing chip, a multi-chip module including multiple multi-core processing chips, or other hardware processor and may be known by other names, including but not limited to, a computer processor, a hardware processor, and a multi-core processor.

In certain exemplary embodiments, the exemplary microprocessor 310 executes software instructions stored in memory. The memory may include certain cache memories, main memory, and/or any other suitable type of memory. In certain exemplary embodiments, the memory is discretely located within the ultrasonic occupancy sensor 200. In certain configurations, the memory is also integrated with the microprocessor 310.

Those skilled in the art will appreciate that certain of a number of other components and/or configurations may be used for a preamplifier. Each preamplifier may include discrete components, an integrated circuit, some other form of circuitry, or any suitable combination thereof. For example, for the configuration shown in FIG. 3, the capacitor 322 may be 0.1 µF, the resistor 324 may be 200 kΩ, the resistor 330 may be 100 kΩ, the capacitors 332 and 338 may be 1 µF, and the resistor 334 may be open. In exemplary embodiments, multiple preamplifiers operate in parallel with each other to process signals received by a number of individual receivers, rather than using a single preamplifier to process a combined signal received by multiple receivers.

Figure 4:
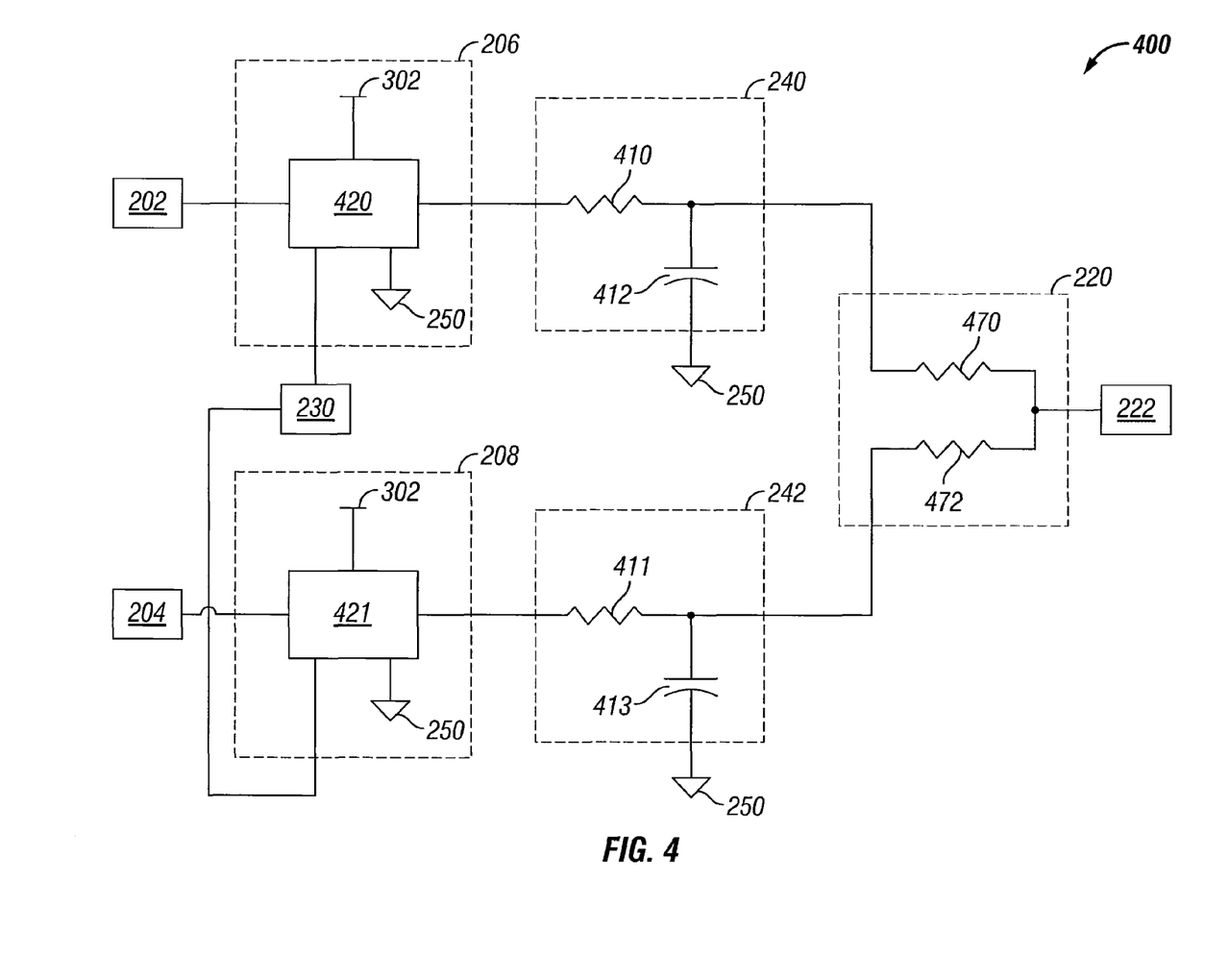
FIG. 4 shows an exemplary mixer circuit for use in the ultrasonic occupancy sensor in accordance with certain exemplary embodiments.

FIG. 4 shows a system 400 having an exemplary mixer circuit 220 in accordance with certain exemplary embodiments. Referring now to FIGS. 1-4, the exemplary mixer circuit 220 is a passive circuit that includes the resistor 470 in parallel with the resistor 472. The mixer circuit 220 can also be an active circuit having one or more of a number of other components, including but not limited to an integrated circuit and a capacitor. The resistor 470 and/or the resistor 472 can have one of a number of different resistance values. For example, the resistor 470 and the resistor 472 can each be 1 kΩ. In certain exemplary embodiments, the resistor 470 and the resistor 472 have the same value so that the differences in the demodulated signals can be proportionally mixed by the mixer circuit 220. Alternatively, the resistor 470 and the resistor 472 can have different values. The exemplary mixer circuit 220 has one resistor (or corresponding circuit) for each signal received from a low pass filter (e.g., low pass filter A 240, low pass filter B 242).

The demodulator circuit 206 includes a single analog switch integrated circuit (IC) 420, and the demodulator circuit 208 includes a different analog switch integrated circuit (IC) 421. Communicably coupled between the demodulators and the mixer circuit 220 are the low pass filter A 240 and the low pass filter B 242. In this example, each low pass filter is a passive low pass filter that includes resistor 410 and capacitor 412. In alternative exemplary embodiments, an active low pass filter is used in place of the passive low pass filter shown in FIG. 4.

As described above with respect to FIG. 3, each demodulator circuit (in this case, demodulator circuit A 206 and demodulator circuit B 208) receives an amplified signal from a corresponding preamplifier (in this case, the preamp A 202 and the preamp B 204, respectively) and sends a beat frequency to the corresponding low pass filter (in this case, the low pass filter A 240 and the low pass filter B 242, respectively). Specifically, in this example, each demodulator circuit includes a single analog switch IC 420, 421, which combines the preamplified received ultrasonic signal and, using the frequency provided by the oscillator 230, generates a number of beat frequencies. In certain exemplary embodiments, each beat frequency includes a sum of the demodulated signals and a difference between the demodulated signals. If the analog switch has multiple switches, then the preamplified ultrasonic signals from all the preamplifier circuits are fed, directly or indirectly, to the input terminal of the different switches.

Each single analog switch IC 420, 421 may be a single switch or a number of switches and may be an IC, certain discrete components (e.g., resistor, diode, capacitor), a microprocessor, some other component, or any suitable combination thereof. An example of a single analog switch IC 420, 421 is a BU4S66. In the exemplary embodiments having multiple single analog switch ICs, the single analog switch ICs are configured in any type of network (e.g., coupled in series, parallel).

In exemplary embodiments where the single analog switch IC 420, 421 is an IC or some other component that requires an independent source of power, the power is typically supplied from a power source. In FIG. 4, the power source is the common circuit voltage 302. In addition, or alternatively, the single analog switch IC 420, 421 is fed by certain other sources of power. Such other sources of power include, but are not limited to, a battery, a capacitor, and an independent voltage feed. Another portion of the single analog switch IC 420, 421 may be electrically coupled to ground 250.

In certain exemplary embodiments, the demodulator circuit A 206 and the demodulator circuit B 208 sends the beat frequency to the corresponding low pass filter (in this case, low pass filter A 240 and low pass filter B 242). The low pass filters 240, 242 restrict signals (e.g., alternating current energy) from flowing there through based on a frequency of a signal exceeding a certain threshold level. For example, the low pass filters 240, 242 may have a threshold level of 25 kHz, which would block any signal having a frequency greater than 25 kHz and which would allow any signal having a frequency less than 25 kHz to pass through. In certain exemplary embodiments, the low pass filters 240, 242 filter out the sum of the demodulated signals from the beat frequency generated by the single analog switch IC 420, 421, and allow the difference between the demodulated signals of the beat frequency to pass through to the mixer circuit 220. The output of the low pass filters 240, 242 may be called a difference between the demodulated signals. The low pass filters 240, 242 may be active or passive. As shown in FIG. 4, the low pass filters 240, 242 are passive filters that are electrically coupled to the output of the corresponding demodulator circuit and includes the resistor 410 and the capacitor 412 for low pass filter A 240 and the resistor 411 and the capacitor 413 for the low pass filter B 242.

The exemplary low pass filters 240, 242 may be a single filter or a number of filters and may include certain discrete components (e.g., resistor, diode, capacitor), an IC, a microprocessor, some other component, or any suitable combination thereof. When the low pass filters 240, 242 include discrete components, such discrete components typically have a number of values. For example, in FIG. 4, the resistor 410 is 10.0 kΩ, and the capacitor 412 is 0.1 µF. When there are multiple low pass filters, the low pass filters may be configured in any type of network (e.g., coupled in series, parallel). In certain exemplary embodiments, the low pass filters 241, 242 may be part of the demodulator circuit 206, 208.

The difference between the demodulated signals is sent by each low pass filter 240, 242 to the mixer circuit 220. The mixer circuit 220 combines the difference between the demodulated signals to generate an integrated signal, which is sent to the bandpass filter 222. The bandpass filter 222 amplifies the integrated signal to yield only a motion component of the signal. The motion signal subsequently passes through a Doppler shift detector (not shown), which detects movement in the space being monitored by determining changes in frequency in the motion signal. When there is no movement in the space, there is no frequency change (Doppler shift) between the demodulated signals, which means that the frequency of the integrated signal (and thus the motion signal) is substantially zero. When there is movement in the space, the demodulated signals will have different frequencies, which means that the frequency of the integrated signal (and thus the motion signal) is greater than zero.

Figure 5A:
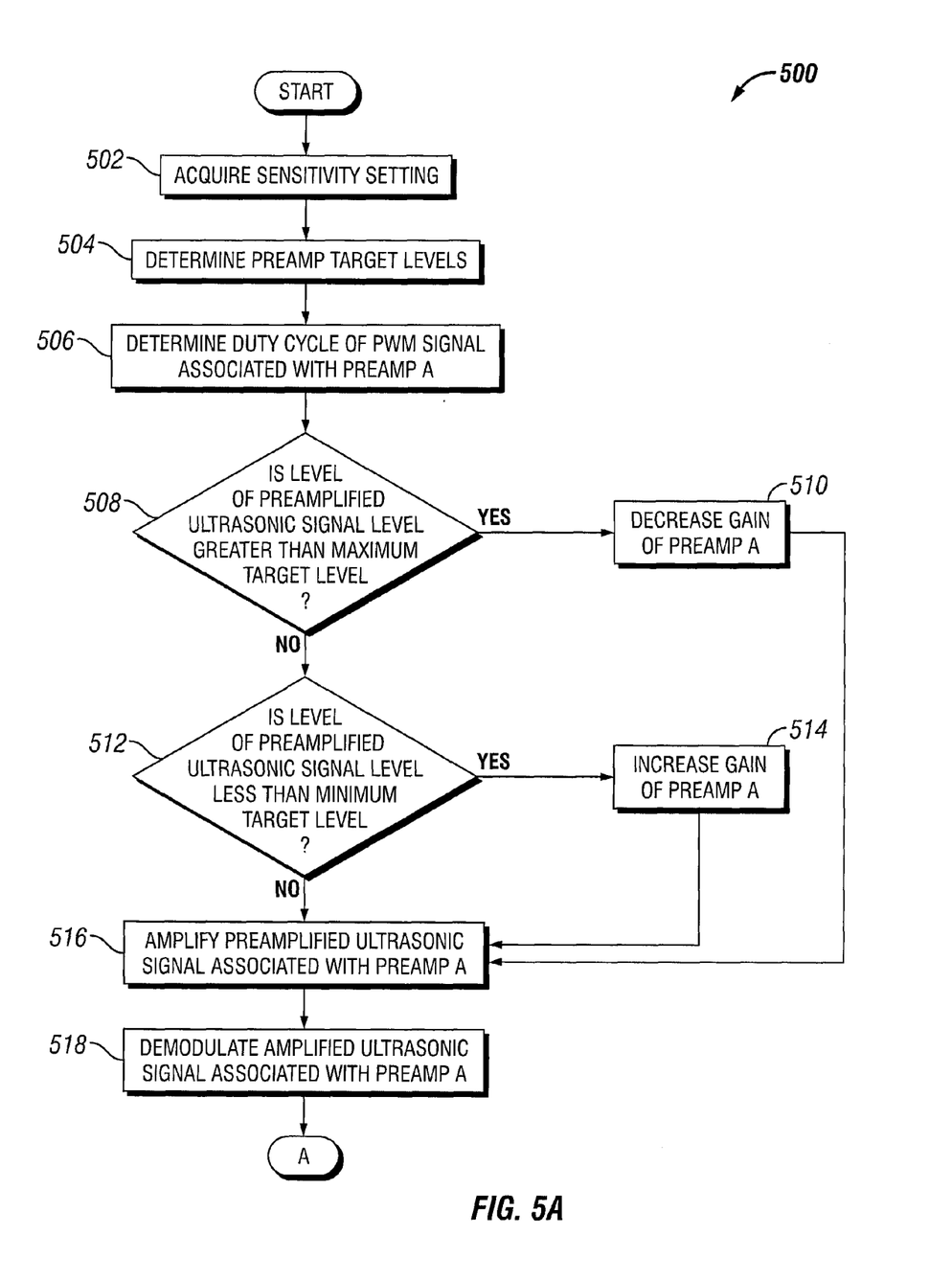
FIGS. 5A and 5B show a flowchart of a method of operation of the multiple ultrasonic preamps with independent AGC in accordance with certain exemplary embodiments.
Figure 5B:
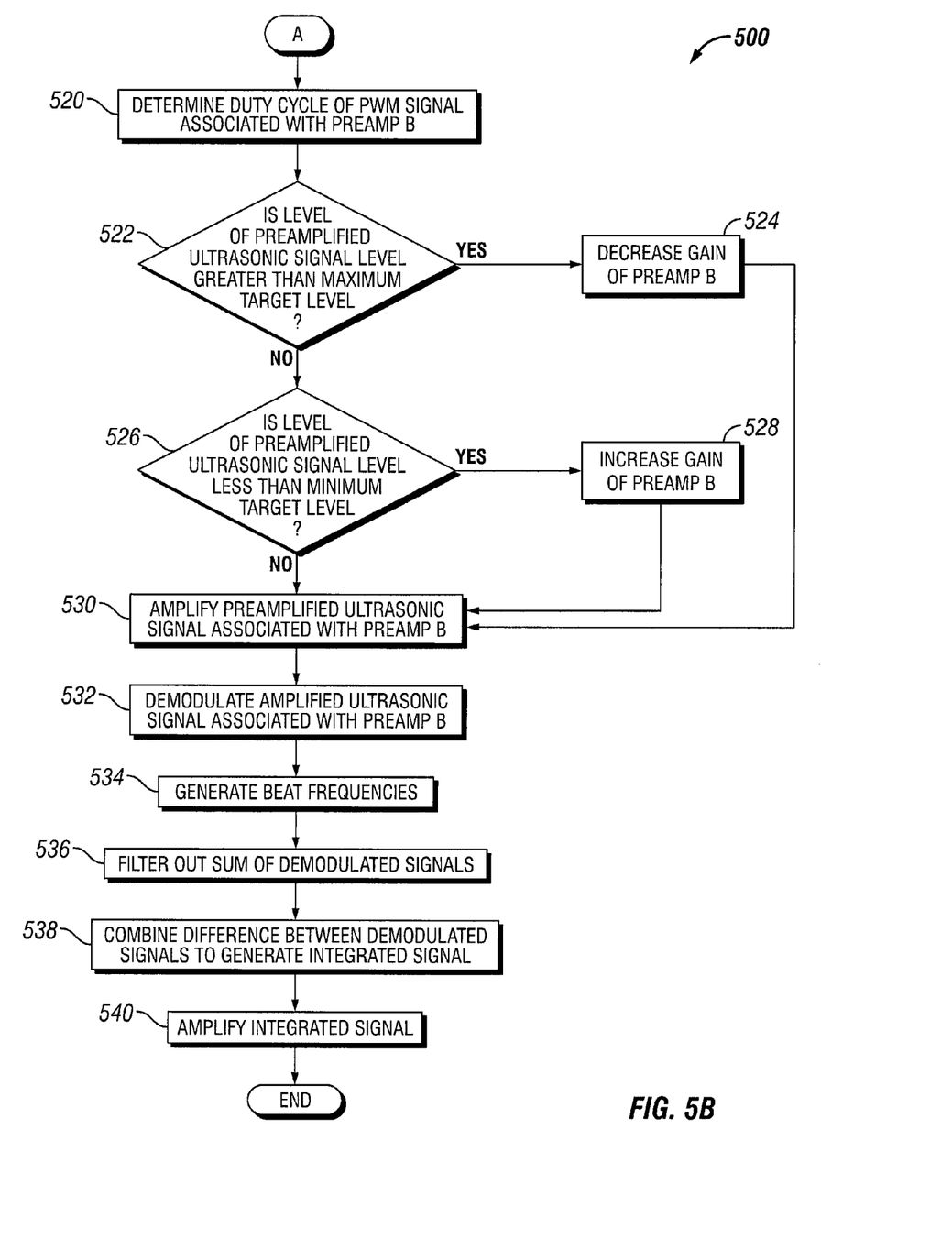

FIGS. 5A and 5B are a flowchart of a method 500 for generating an integrated signal in accordance with certain exemplary embodiments. While the various steps in this flowchart are presented and described sequentially, one of ordinary skill will appreciate that some or all of the steps may be executed in different orders, may be combined or omitted, and some or all of the steps may be executed in parallel. For example, while Steps 520-532 are shown in FIGS. 5A and 5B and described below as occurring in series with and subsequent to Steps 506-518, Steps 520-532 may be performed in parallel with Steps 506-518.

Further, in certain of the exemplary embodiments, certain of the steps described below may be omitted, repeated, and/or performed in a different order. In addition, a person of ordinary skill in the art will appreciate that additional steps, not shown in FIGS. 5A and 5B, may be included in performing this method. Accordingly, the specific arrangement of steps should not be construed as limiting the scope. In addition, a particular computing device, as described, for example, in FIG. 6 below, may be used to perform certain of the steps for the method 500 described below.

Now referring to FIGS. 1-5B, the exemplary method 500 begins at the START step and proceeds to Step 502, where a sensitivity setting is acquired. In certain exemplary embodiments, the sensitivity setting is acquired from the potentiometer 374, which sends a voltage to the microprocessor 310, where the voltage is proportional to the sensitivity setting. The sensitivity setting may be adjusted manually and/or automatically (e.g., in response to an occurrence of a condition, such as an operating threshold or the passage of time). In step 504, the preamp target levels are determined. In certain exemplary embodiments, the preamp target levels are determined by the microprocessor 310 based on the sensitivity setting. For example, the preamp target levels may be proportional to the sensitivity setting. In such a case, when the sensitivity setting is relatively low, the corresponding acoustic waves have a lower amplitude. In addition, a relatively low sensitivity setting will cause the preamp target levels to be lower. The exemplary preamp target levels include a minimum target level and a maximum target level, which bound a range of target levels. The preamp target levels may be calculated using fixed algorithms, calculated using algorithms that are adjusted (based, for example, on user input and/or on operating experience of the ultrasonic occupancy sensor), determined using default values, and/or determined some other suitable means.

The duty cycle of the PWM signal for the preamp A 202 is determined in step 506. In certain exemplary embodiments, the duty cycle (i.e., the pulse width) of the PWM signal (also called a preamplified ultrasonic signal gain) for the preamp A 202 is determined by the microprocessor 310 based on the preamplified signal level generated by the peak detection circuit A 328. Beginning with step 508, a determination is made as to whether an adjustment should be made to the gain of the preamp A 202 based on whether the level of the preamplified ultrasonic signal is within, or excluded from, the range of target levels.

Specifically, in step 508, a determination is made as to whether the level of the preamplified ultrasonic signal for the preamp A 202 exceeds the maximum target level for the preamp A 202. If, as determined by the microprocessor 310, the unit of measure associated with the level of the preamplified ultrasonic signal for the preamp A 202 is different than the unit of measure associated with the maximum target level for the preamp A 202, then the microprocessor 310 may convert one or both so that a common unit of measure is achieved. If the level of the preamplified ultrasonic signal for the preamp A 202 exceeds the maximum target level for the preamp A 202, then the YES branch is followed to step 510. If the level of the preamplified ultrasonic signal for the preamp A 202 does not exceed the maximum target level for the preamp A 202, then the NO branch is followed to step 512.

In step 510, the gain of the preamp A 202 is decreased. As a result, the gain of the corresponding preamplifier is decreased. The gain of the preamp A 202 may be decreased by the microprocessor 310 and/or by the op amp A 326 and associated components. In certain exemplary embodiments, the gain of the preamp A 202 is decreased based, in part, on the amount by which the level of the preamplified ultrasonic signal for the preamp A 202 exceeds the maximum target level for the preamp A 202. The gain of the preamp A 202 is decreased according to certain default settings, certain algorithms, and/or some other suitable method. In certain embodiments, when the gain of the preamp A 202 is decreased, the PWM of the preamplified ultrasonic signal associated with the preamp A 202 is increased. The PWM of the preamplified ultrasonic signal associated with the preamp A 202 is increased by the microprocessor 310 and/or by the op amp A 326 and associated components. When the gain of the preamp A 202 is decreased, then the process proceeds to step 516.

In step 512, a determination is made as to whether the level of the preamplified ultrasonic signal for the preamp A 202 is less than the minimum target level for the preamp A 202. If, as determined by the microprocessor 310, the unit of measure associated with the level of the preamplified ultrasonic signal for the preamp A 202 is different than the unit of measure associated with the minimum target level for the preamp A 202, then the microprocessor 310 may convert one or both so that a common unit of measure is achieved. If the level of the preamplified ultrasonic signal for the preamp A 202 is less than the minimum target level for the preamp A 202, then the YES branch is followed to step 514. On the other hand, if the level of the preamplified ultrasonic signal for the preamp A 202 is not less than the minimum target level for the preamp A 202, then the NO branch is followed to step 516.

The gain of the preamp A 202 is increased in step 514. As a result, the amplitude of the corresponding preamplified ultrasonic signal is increased. The gain of the preamp A 202 may be increased by the microprocessor 310 and/or by the op amp A 326 and associated components. In certain exemplary embodiments, the gain of the preamp A 202 is increased based, in part, on the amount by which the level of the preamplified ultrasonic signal for the preamp A 202 is less than the maximum target level for the preamp A 202. The gain of the preamp A 202 may be increased according to certain default settings, certain algorithms, and/or some other suitable method. In certain exemplary embodiments, when the PWM duty cycle of the preamplified ultrasonic signal associated with the preamp A 202 is decreased, the gain of the preamp A is increased. The PWM duty cycle of the preamplified ultrasonic signal associated with the preamp A 202 is decreased by the microprocessor 310 and/or by the op amp A 326 and associated components. When the gain of the preamp A 202 is increased, then the process proceeds to step 516.

In step 516, the preamplified ultrasonic signal associated with the preamp A 202 is amplified. In certain exemplary embodiments, the preamplified ultrasonic signal associated with the preamp A 202 is amplified by the op amp A 326 and associated components. The preamplified ultrasonic signal associated with the preamp A 202 is amplified based on the level of the preamplified ultrasonic signal and the target levels for the preamp A 202 in certain exemplary embodiments. The amplified ultrasonicsignal is demodulated in step 518. In certain exemplary embodiments, the amplified ultrasonic signal is demodulated by the demodulator circuit A 206. The amount of Doppler shift in the amplified ultrasonic signal may be based proportionately on the size of the amplified ultrasonic signal. When the preamplified ultrasonic signal associated with the preamp A 202 is amplified and compared to the reference signal from the oscillator circuit 230, a demodulated signal results. In certain exemplary embodiments, steps 502-518 are performed when the signals generated by the multiple receivers (e.g., the receiver A 210, the receiver B 212) are combined prior to being processed by the preamps (e.g., preamp A 202, preamp B 204). In such a case, the process proceeds to step 538 after step 518 is completed.

In step 520, the duty cycle of the PWM signal for the preamp B 204 is determined. In certain exemplary embodiments, the duty cycle of the PWM signal for the preamp B 204 is determined by the microprocessor 310. The duty cycle of the PWM signal for the preamp B 204 is based on the preamplified signal level generated by the peak detection circuit B 358. In step 522, a determination is made as to whether the level of the preamplified ultrasonic signal for the preamp B 204 exceeds the maximum target level for the preamp B 204. If, as determined by the microprocessor 310, the unit of measure associated with the level of the preamplified ultrasonic signal for the preamp B 204 is different than the unit of measure associated with the maximum target level for the preamp B 204, then the microprocessor 310 may convert one or both so that a common unit of measure is achieved. If the level of the preamplified ultrasonic signal for the preamp B 204 exceeds the maximum target level for the preamp B 204, then the YES branch is followed to step 524. Otherwise, the NO branch is followed to step 526.

The gain of the preamp B 204 is decreased in step 524. As a result, the gain of the corresponding preamplifier is decreased. The gain of the preamp B 204 may be decreased by the microprocessor 310 and/or by the op amp B 356 and associated components. In certain exemplary embodiments, the gain of the preamp B 204 is decreased based, in part, on the amount by which the level of the preamplified ultrasonic signal for the preamp B 204 exceeds the maximum target level for the preamp B 204. The gain of the preamp B 204 may be decreased according to certain default settings, certain algorithms, and/or some other suitable method. In certain embodiments, when the gain of the preamp B 204 is decreased, the PWM duty cycle associated with the preamp B 204 is increased. The duty cycle of the PWM associated with the preamp B 204 is increased by the microprocessor 310 and/or by the op amp B 356 and associated components. When the gain of the preamp B 204 is decreased, then the process proceeds to step 530.

In step 526, a determination is made as to whether the level of the preamplified ultrasonic signal for the preamp B 204 is less than the minimum target level for the preamp B 204. If, as determined by the microprocessor 310, the unit of measure associated with the level of the preamplified ultrasonic signal for the preamp B 204 is different than the unit of measure associated with the minimum target level for the preamp B 204, then the microprocessor 310 may convert one or both so that a common unit of measure is achieved. If the level of the preamplified ultrasonic signal for the preamp B 204 is less than the minimum target level for the preamp B 204, then the YES branch is followed to step 528. Otherwise, the NO branch is followed to step 530.

In step 528, the gain of the preamp B 204 is increased. As a result, the amplitude of the corresponding preamplified ultrasonic signal is increased. The gain of the preamp B 204 may be increased by the microprocessor 310 and/or by the op amp B 356 and associated components. In certain exemplary embodiments, the gain of the preamp B 204 is increased based, in part, on the amount by which the level of the preamplified ultrasonic signal for the preamp B 204 is less than the maximum target level for the preamp B 204. The gain of the preamp B 204 may be increased according to certain default settings, certain algorithms, and/or some other suitable method. In certain exemplary embodiments, when the PWM duty cycle of the preamplified ultrasonic signal associated with the preamp B 204 is decreased, the gain of the preamp B 204 is increased. The PWM duty cycle associated with the preamp B 204 is decreased by the microprocessor 310 and/or by the op amp B 356 and associated components. When the gain of the preamp B 204 is increased, then the process proceeds to step 530.

In step 530, the preamplified ultrasonic signal associated with the preamp B 204 is amplified. In certain exemplary embodiments, the preamplified ultrasonic signal associated with the preamp B 204 is amplified by the op amp B 356 and associated components. In certain exemplary embodiments, the preamplified ultrasonic signal associated with the preamp B 204 is amplified based on the level of the preamplified ultrasonic signal and the target levels for the preamp B 204. In step 532, the amplified ultrasonic signal is demodulated. The amplified ultrasonic signal may be demodulated by the demodulator circuit B 208. The amount of Doppler shift in the amplified ultrasonic signal may be based proportionately on the amplitude of the amplified ultrasonic signal. When the preamplified ultrasonic signal associated with the preamp B 204 is amplified and compared to the reference signal from the oscillator circuit 230, a demodulated signal results.

In step 534, beat frequencies are generated. In certain exemplary embodiments, the beat frequencies are generated by a single analog switch IC 420, 421. In certain exemplary embodiments, the beat frequencies of the demodulated signals result when the preamplified ultrasonic signals are compared to the frequency generated by the oscillator 230. When the preamplified ultrasonic signals are compared to the oscillator signal, a number of beat frequencies are generated. In certain exemplary embodiments, each set of beat frequencies includes a sum of the signals and a difference between the signals.

The sums of the demodulated signals are filtered out of the beat frequencies in step 536. In certain exemplary embodiments, the sum of the demodulated signals is filtered out of the beat frequencies using the low pass filter 240, 242. As a result, the differences between the demodulated signals pass through the low pass filter 240, 242. The low pass filter may be passive or active.

In step 538, the difference between the demodulated signals is combined to generate an integrated signal. In certain exemplary embodiments, the integrated signal is generated by the mixer circuit 220. The mixer circuit may be passive or active. In step 540, the integrated signal is amplified, for example, by the bandpass filter 222. The process then continues to the END step.

Figure 6:
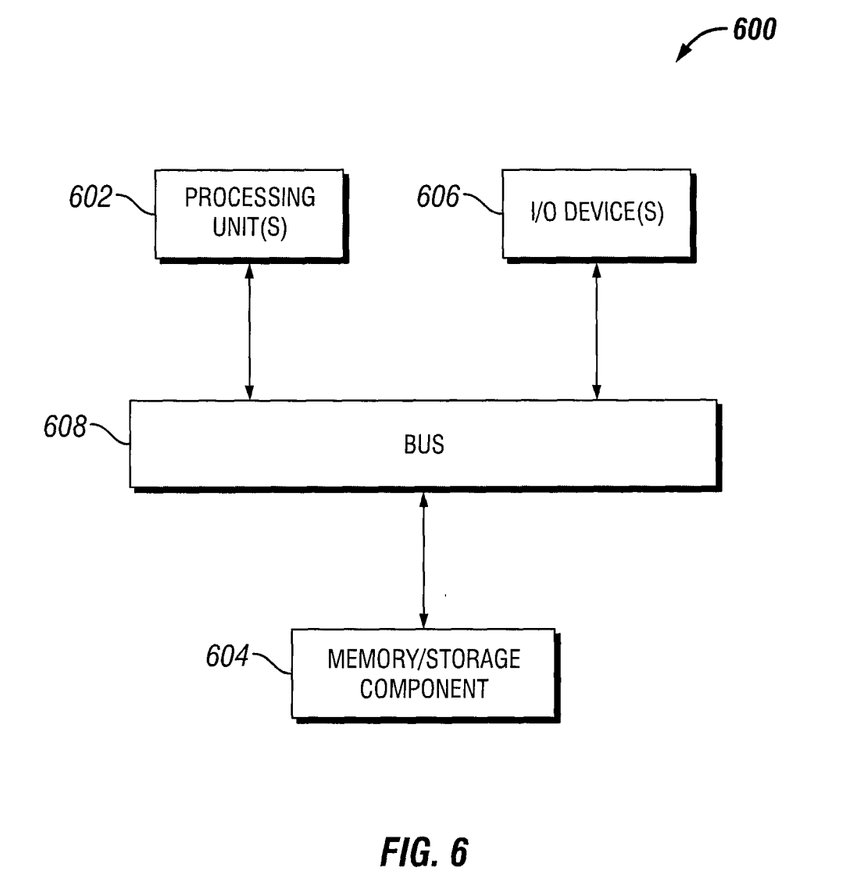
FIG. 6 shows a computer system for implementing multiple ultrasonic preamps with independent AGC in accordance with certain exemplary embodiments.

FIG. 6 illustrates one embodiment of a computing device 600 capable of implementing certain of the various techniques described herein, and which may be representative, in whole or in part, of the elements described herein. Computing device 600 is only one example of a computing device and is not intended to suggest any limitation as to scope of use or functionality of the computing device and/or its possible architectures. Neither should computing device 600 be interpreted as having any dependency or requirement relating to any one or combination of components illustrated in the example computing device 600.

Computing device 600 includes certain processors or processing units 602, certain memory/storage components 604, certain input/output (I/O) devices 606, and a bus 608 that allows the various components and devices to communicate with one another. Bus 608 represents certain of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents certain computer storage media. Memory/storage component 604 may include volatile media (such as random access memory (RAM)) and/or nonvolatile media (such as read only memory (ROM), flash memory, optical disks, magnetic disks, and so forth). Memory/storage component 604 can include fixed media (e.g., RAM, ROM, a fixed hard drive, etc.) as well as removable media (e.g., a Flash memory drive, a removable hard drive, an optical disk, and so forth).

Certain I/O devices 606 allow a customer, utility, or other user to enter commands and information to computing device 600, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 600 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 600 includes at least the minimal processing, input, and/or output means necessary to practice certain embodiments.

Further, those skilled in the art will appreciate that certain elements of the aforementioned computer device 600 may be located at a remote location and connected to the other elements over a network. Further, certain exemplary embodiments may be implemented on a distributed system having a plurality of nodes, where each portion of the implementation (e.g., microprocessor 310, mixer circuit 220) may be located on a different node within the distributed system. In certain embodiments, the node corresponds to a computer system. Alternatively, the node may correspond to a processor with associated physical memory. The node may alternatively correspond to a processor with shared memory and/or resources.

Using exemplary embodiments described herein, the signals generated by multiple transducers (receivers) having different performance features (e.g., one is more sensitive than another) can be processed before being combined so that such artificial biases are reduced and/or eliminated. Further, when different signals are out of phase relative to each other, using exemplary embodiments described herein reduce and/or eliminate a cancelling effect that combining such signals before processing can have.

Further, exemplary embodiments can adjust the gain of a signal based on the position of objects (e.g., a wall) relative to a sensor. For example, a signal received from a relatively distant object can appear weaker at the receiver, and using exemplary embodiments can increase the gain of such signal to give the signal relatively equal strength compared to other signals received. In other words, the ultrasonic occupancy sensor using exemplary embodiments described herein may be placed at any location in a space, and distance biases that derive from asymmetrical placement of the sensor and/or asymmetrical positioning of objects in the space may be reduced.

Exemplary embodiments also allow a sensitivity setting to be changed to adjust certain target levels of the preamplifiers. A gain may be adjusted for certain preamplifiers based on the target levels and the level of a preamplified ultrasonic signal. As a result, smaller signals are amplified less, and larger signals are amplified more.

Although embodiments described herein are made with reference to exemplary embodiments, it should be appreciated by those skilled in the art that various modifications are well within the scope and spirit of this disclosure. Those skilled in the art will appreciate that the exemplary embodiments described herein are not limited to any specifically discussed application and that the embodiments described herein are illustrative and not restrictive. From the description of the exemplary embodiments, equivalents of the elements shown therein will suggest themselves to those skilled in the art, and ways of constructing other embodiments using the present disclosure will suggest themselves to practitioners of the art. Therefore, the scope of the exemplary embodiments is not limited herein.

We claim:

1. A method for generating an integrated signal, the method comprising:
    receiving, via a first preamplifier, a first signal from a first receiver of a plurality of receivers;
    processing, using a first demodulator, a first amplified signal to generate a first demodulated signal, wherein the first amplified signal is derived from the first signal;
    receiving, via a second preamplifier, a second signal from a second receiver of the plurality of receivers;
    processing, using a second demodulator, a second amplified signal to generate a second demodulated signal, wherein the second amplified signal is derived from the second signal;

processing the first demodulated signal and the second demodulated signal to generate the integrated signal; and determining a target level for the first preamplifier and the second preamplifier, wherein the target level comprises a minimum target level and a maximum target level.

2. The method of claim 1, wherein the first signal and the second signal are received substantially simultaneously.

3. The method of claim 1, wherein the integrated signal is generated by combining the first demodulated signal and the second demodulated signal to generate a beat frequency, wherein the beat frequency comprises:
a sum of the first demodulated signal and the second demodulated signal; and
a difference between the first demodulated signal and the second demodulated signal.

4. The method of claim 3, the integrated signal is further generated using a low-pass filter to eliminate the sum of the first demodulated signal and the second demodulated signal from the beat frequency and pass through the difference between the first demodulated signal and the second demodulated signal.

5. The method of claim 1, further comprising:
amplifying the integrated signal to generate a motion signal.

6. The method of claim 1, further comprising:
acquiring a sensitivity setting,
wherein the sensitivity setting is used to determine the target level for the first preamplifier and the second preamplifier.

7. The method of claim 1, wherein processing the first amplified signal comprises:
determining a first duty cycle of a first pulse width modulation (PWM) signal, wherein the first preamplified ultrasonic signal is derived from the first signal;
decreasing a first gain of the first preamplifier when the first level of the first preamplified ultrasonic signal exceeds the maximum target level;
increasing the first gain of the first preamplifier when the first level of the first preamplified ultrasonic signal is less than the minimum target level; and
amplifying, using the first gain and the first preamplifier, the first preamplified ultrasonic signal to generate the first amplified signal.

8. The method of claim 7, wherein processing the second amplified signal comprises:
determining a second duty cycle of a second PWM signal;
decreasing a second gain of the second preamplifier when the second level of the second preamplified ultrasonic signal exceeds the maximum target level;
increasing the second gain of the second preamplifier when the second level of the second preamplified ultrasonic signal is less than the minimum target level; and
amplifying, using the second gain and the second preamplifier, the second preamplified ultrasonic signal to generate the second amplified signal.

9. A method for automatic gain control of a preamplifier, the method comprising:
receiving a sensitivity setting;
determining a target level for a preamplifier based on the sensitivity setting, wherein the target level comprises a minimum target level and a maximum target level bounding a range of target levels;
determining a duty cycle of a pulse width modulation (PWM) signal associated with the preamplifier;
adjusting a gain of the preamplifier when the level of the preamplified ultrasonic signal is excluded from the range of target levels; and
amplifying, using the gain and the preamplifier, the preamplified ultrasonic signal to generate an amplified signal.

10. The method of claim 9, wherein adjusting the gain comprises decreasing the gain of the preamplifier when the level exceeds the maximum target level.

11. The method of claim 10, wherein decreasing the gain of the preamplifier results from increasing, using a P-channel junction field effect transistor, the duty cycle of the PWM signal.

12. The method of claim 10, wherein decreasing the gain of the preamplifier results from decreasing, using a N-channel junction field effect transistor, the duty cycle of the PWM signal.

13. The method of claim 9, wherein adjusting the gain comprises increasing the gain of the preamplifier when the level is less than the minimum target level.

14. The method of claim 13, wherein increasing the gain of the preamplifier results from decreasing, using a P-channel junction field effect transistor, the duty cycle of the PWM signal.

15. The method of claim 13, wherein increasing the gain of the preamplifier results from increasing, using a N-channel junction field effect transistor, the duty cycle of the PWM signal.

16. An ultrasonic occupancy sensor, comprising:
a first demodulator configured to generate a first demodulated signal, wherein the first demodulated signal is derived from a first signal received by a first receiver;
a second demodulator circuit configured to generate a second demodulated signal, wherein the second demodulated signal is derived from a second signal received by a second receiver; and
a mixer circuit communicably coupled to the first demodulator and the second demodulator, wherein the mixer circuit is configured to:
receive a difference between the first demodulated signal and the second demodulated signal; and
generate an integrated signal.

17. The ultrasonic occupancy sensor of claim 16, further comprising:
a first preamplifier communicably coupled to the first demodulator and configured to amplify a first ultrasonic signal to generate the first amplified signal, wherein the first demodulator is configured to receive the first amplified signal to generate the first demodulated signal; and
a second preamplifier communicably coupled to the second demodulator and configured to amplify a second ultrasonic signal to generate the second amplified signal, wherein the second demodulator is configured to receive the second amplified signal to generate the second demodulated signal.

18. The ultrasonic occupancy sensor of claim 17, further comprising:
a microprocessor communicably coupled to the first preamplifier and the second preamplifier, wherein the microprocessor is configured to:
receive a sensitivity setting;
determine, based on the sensitivity setting, a maximum target level and a minimum target level for the first preamplifier and the second preamplifier;
adjust a first gain of the first preamplifier, wherein the first gain of the first preamplifier is increased when a first level of the first preamplified ultrasonic signal is less than the minimum target level, and wherein the first gain of the first preamplifier is decreased when the first level of the first preamplified ultrasonic signal exceeds the maximum target level; and adjust a second gain of the second preamplifier, wherein the second gain of the second preamplifier is increased when a second level of the second preamplified ultrasonic signal is less than the minimum target level, and wherein the second gain of the second preamplifier is decreased when the second level of the second preamplified ultrasonic signal exceeds the maximum target level.

19. The ultrasonic occupancy sensor of claim 18, further comprising:

a first peak detection circuit communicably coupled to the microprocessor and configured to determine a first signal level of the first signal received by the first receiver, wherein the first signal level is used by a microprocessor to generate the first preamplified ultrasonic signal; and a second peak detection circuit communicably coupled to the microprocessor and configured to determine a second signal level of the second signal received by the second receiver, wherein the second signal level is used by a microprocessor to generate the second preamplified ultrasonic signal.

20. The ultrasonic occupancy sensor of claim 16, further comprising:

a bandpass filter communicably coupled to the mixer circuit and configured to receive the integrated signal and generate a motion signal.

21. The ultrasonic occupancy sensor of claim 16, further comprising:

a first low pass filter communicably coupled between the first demodulator circuit and the mixer circuit; and a second low pass filter communicably coupled between the second demodulator circuit and the mixer circuit.

22. The ultrasonic occupancy sensor of claim 21, wherein the first demodulator comprises a first analog switch integrated circuit.

23. The ultrasonic occupancy sensor of claim 22, wherein the first analog switch integrated circuit is electrically coupled to an oscillator.

24. The ultrasonic occupancy sensor of claim 23, wherein the first analog switch integrated circuit is configured to combine the first demodulated signal and the second demodulated signal to generate a beat frequency, wherein the beat frequency comprises a sum of the first demodulated signal and the second demodulated signal and the difference between the first demodulated signal and the second demodulated signal.

25. The ultrasonic occupancy sensor of claim 24, wherein the low pass filter is configured to filter out the sum of the first demodulated signal and the second demodulated signal and allow the difference between the first demodulated signal and the second demodulated signal to pass therethrough.

26. The ultrasonic occupancy sensor of claim 21, wherein the low pass filer is a passive low pass filter.

27. The ultrasonic occupancy sensor of claim 16, wherein the mixer circuit comprises a first resistor having a first side communicably coupled to the first low pass filter and a second resistor having a first side communicably coupled to the second low pass filter, wherein the first resistor and the second resistor are electrically coupled to each other at a second side.

* * * * *